United States Patent [19]

Morikawa

[11] Patent Number: 5,592,919
[45] Date of Patent: Jan. 14, 1997

[54] ELECTRONIC CONTROL SYSTEM FOR AN ENGINE AND THE METHOD THEREOF

[75] Inventor: Koji Morikawa, Tokyo-to, Japan

[73] Assignee: Fuji Jukogyo Kabushiki Kaisha, Tokyo, Japan

[21] Appl. No.: 355,190

[22] Filed: Dec. 8, 1994

[30] Foreign Application Priority Data

Dec. 17, 1993 [JP] Japan ................................. 5-317685
Jan. 25, 1994 [JP] Japan ..................................... 6-6577

[51] Int. Cl.$^6$ ................................................. F02D 41/14
[52] U.S. Cl. ............................................................ 123/435
[58] Field of Search ............................................. 123/435

[56] References Cited

U.S. PATENT DOCUMENTS

| | | | |
|---|---|---|---|
| 4,216,750 | 8/1980 | Kobayashi | 123/435 |
| 4,960,097 | 10/1990 | Tachibana et al. | 123/494 |
| 4,977,881 | 12/1990 | Abe et al. | 123/674 |
| 5,024,199 | 6/1991 | Abe | 123/674 |
| 5,299,550 | 4/1994 | Inoue | 123/674 |
| 5,419,302 | 5/1995 | Abe | 123/674 |

*Primary Examiner*—Andrew M. Dolinar
*Attorney, Agent, or Firm*—Beveridge, DeGrandi, Weilacher & Young, L.L.P.

[57] ABSTRACT

The air-fuel ratio of a lean-burn engine is controlled so as to be adjusted to a lean-burn air-fuel ratio with a low NOx concentration. As this is done, an actual combustion fluctuating rate is detected from the cylinder pressure, and the air-fuel ratio is adjusted to the rich side with respect to the lean-side limit, whereby a satisfactory driving performance can be secured. The state of NOx exhaust is determined by an actual NOx concentration, and the air-fuel ratio is adjusted to the lean side with respect to the allowable limit of the NOx exhaust. On the other hand, the combustion fluctuating rate and an allowable limit value of the combustion changing rate under the driving conditions concerned are compared, while the NOx exhaust rate and an allowable limit value of the NOx exhaust rate under the same driving conditions are compared. The EGR amount is decreased when the combustion fluctuating rate is higher than the allowable limit value, and is increased when the NOx exhaust rate is higher than the allowable limit value of the NOx exhaust rate. Thus, the NOx exhaust can be decreased.

4 Claims, 8 Drawing Sheets

ELECTRONIC CONTROL SYSTEM FOR AN ENGINE AND THE METHOD THEREOF

BACKGROUND OF THE INVENTION

1. Field of the Invention

The present invention relates to an engine control apparatus for controlling a lean-burn air-fuel ratio of an air-fuel mixture in a lean-burn engine for a vehicle, and more particularly, to the engine control apparatus provided with an EGR (exhaust gas recirculation) system in which a small amount of exhaust gas is mixed with intake air, whereby reduction of nitrogen oxides in the exhaust gas and improvement of the running performance can be expected.

2. Description of the Related Art

Lean-burn engines have been studied and developed as fuel-saving engines for new-generation vehicles. In this type of the engine, swirl or turbulence is generated in a combustion chamber during air induction, and a leaner air-fuel mixture than that of a theoretical air-fuel ratio is burned. In such a lean-burn engine, the air-fuel mixture is so lean that the amount of exhausted HC and CO gases is originally small, whereas perfect combustion advances to increase the NOx exhaust gases. After a certain air-fuel ratio is reached, however, the NOx delivery decreases to improve the exhaust gas characteristics as the air-fuel ratio increases.

Prior art air-fuel ratio control techniques are described in Jpn. Pat. Appln. Laid-Open (KOKAI) Publication Nos. 60-27748 and 58-38354. In the case where the air-fuel ratio exceeds the lean-side limit, there is a possibility of a misfire, an increase of combustion fluctuation, and driving performance deterioration. In the conventional methods, torque variation is detected so that the air-fuel ratio is subjected to lean-limit control based on the detected value of the torque variation, whereby the misfire and lowering of the driving performance are prevented.

According to the techniques of the former publications, however, it cannot be determined whether or not the NOx is actually decreased while the engine is in an operating state, so that the air-fuel ratio must be inevitably decided to a set value within leaner side based on the characteristics of exhausted NOx concentration.

According to a technique described in Jpn. Pat. Appln. Laid-Open (KOKAI) Publication No. 58-13137, moreover, the NOx concentration is estimated indirectly from the cylinder pressure, and an EGR system and the like are controlled in accordance with the NOx concentration, whereby the NOx is decreased.

However, the air-fuel ratio control disclosed in the latter publication is adapted for the EGR system and the like, and cannot be applied to lean-burn air-fuel ratio control.

Conventionally, exhaust gas recirculation (EGR) control is widely used as an effective method for restraining the formation of nitrogen oxides at the time of combustion. In the EGR control, the amount of the exhaust gas is mixed with the intake air, thereby increasing heat capacity of the gases in the cylinder to lower the temperature of the burning gas relatively. If the EGR amount is too large, however, the combustion fluctuation is caused to lower the output, fuel cost performance, and reliability of running performance. It is generally known, therefore, that the EGR amount must be restricted to a necessarily minimum value.

According to a technique described in Jpn. Pat. Appln. KOKAI Publication No. 2-252958, for example, an EGR control region is divided into two parts, feedback and open-loop control regions, depending on the engine driving conditions. In the feedback control region, a target EGR rate for each driving condition is set by referring a map, using the accelerator pedal opening degree and engine speed, whereby the EGR rate is controlled.

In the EGR disclosed in the publication, however, the target EGR rate is set depending on the driving conditions. Although the EGR control can be effected corresponding to the quantity of NOx produced, therefore, it is impossible to restrain combustion fluctuation which accompanies the decrease of the exhaust of the NOx. Accordingly, satisfactory running performance cannot always be obtained in the EGR control region.

Described in Jpn. Pat. Appln. Laid-Open (KOKAI) Publication No. 2-298657, moreover, is a technique such that the EGR amount is controlled in accordance with the intensity of combustion light emitted in the combustion chamber, whereby a sudden increase of the combustion speed is avoided, and the generation of the NOx is restrained.

According to this method, the EGR control is carried out depending on the state of combustion which is detected by the light intensity. Since the NOx exhaust is not detected, however, the EGR rate is not accurately controlled.

SUMMARY OF THE INVENTION

A first object of the present invention is to provide an engine control apparatus which can detect the combustion fluctuating rate and NOx exhaust of a lean-burn engine, to keep the air-fuel mixture within a proper lean-burn region, thereby improving the exhaust gas characteristics and the driving performance.

A second object of the invention is to provide an engine control apparatus which can restrain the combustion fluctuation and reduction of the NOx exhaust, in the engine with the EGR system, so that satisfactory control accuracy can be attained and the driving performance is available at a driver's intention.

In order to achieve the first object, according to a first aspect of the present invention, there is provided an electronic control system for an engine having, an intake manifold connected to the engine for inducing air and fuel mixture, an airflow meter mounted on the intake manifold via a throttle valve for measuring an amount of air induced thereof and for generating an air amount signal, an exhaust manifold connected to the engine for exhausting burnt gases, a nitrogen oxide concentration sensor inserted in the exhaust manifold for detecting a nitrogen oxide amount in the burnt gases and for producing a nitrogen oxide signal, a crank angle sensor mounted on the engine for sensing an engine speed and for generating an engine speed signal, and a pressure sensor mounted on the engine for detecting a combustion pressure in a cylinder and for outputting a pressure signal, the system comprising: driving condition determining means, responsive to the engine speed and pressure signals, for deciding an operating condition of the engine and for generating an operating condition signal; combustion fluctuating rate calculating means, responsive to the pressure and operating condition signals, for calculating an actual combustion fluctuating rate and for generating a fluctuating rate signal; combustion fluctuating rate comparing means, responsive to the operating condition and the fluctuating rate signals, for deriving an optimum air-fuel ratio by comparing the fluctuating rate signal with a standard value stored in a map and for producing a first control signal; nitrogen oxide exhaust calculating means, responsive to the nitrogen oxide signal and the operating condition signal, for calculating an actual nitrogen oxide gas amount and for generating a nitrogen oxide signal; exhaust gas comparing means, responsive to the operating condition signal and the nitrogen oxide signal, for judging the optimum air-fuel ratio by comparing the actual nitrogen oxide gas amount with a desired value stored in a memory and for producing a second control signal; and fuel injection calculating means, responsive to the first and second control signals, for deciding an optimum fuel injection amount corresponded to each driving condition so as to accurately control the engine without fluctuation.

With the arrangement described above, according to the present invention, the air-fuel ratio of the lean-burn engine is controlled to be adjusted to a lean-burn air-fuel ratio with less NOx. Therefore, the actual combustion fluctuating rate is detected on the basis of the internal pressure in the cylinder, and the air-fuel ratio is controlled on the rich side with respect to the lean-side limit, so that satisfactory driving performance can be maintained. Moreover, the state of NOx exhaust is determined by the actual NOx concentration, and the air-fuel ratio is controlled on the lean side with respect to the allowable limit of the NOx exhaust, so that the NOx exhaust can be securely decreased.

Thus, according to the present invention, the actual concentration of the NOx in the exhaust gas in the lean-burn engine is detected so that the state of NOx delivery can be determined, and the air-fuel ratio is controlled so as to be within a region between the lean-side limit for combustion change and the allowable limit of the NOx exhaust. Thus, the driving performance can be improved, and at the same time, the NOx in the exhaust gas can be decreased securely. Moreover, the region for the air-fuel ratio control is extended on the rich side, so that vibration can be also avoided in the driving conditions.

Moreover, the combustion fluctuation is compared with the predetermined value for each set of driving conditions, whereby the proper operating condition is determined. Also, the exhausted NOx is compared with the predetermined value to determine the state of the exhaust gas, and the air-fuel mixture is controlled so as to be richer or leaner. Thus, the control accuracy is high enough.

In order to achieve the second object, according to a second aspect of the present invention, there is provided an electronic control system for an engine having, an intake manifold connected to the engine for inducing air and fuel mixture, an airflow meter mounted on the intake manifold via a throttle valve for measuring an amount of air induced thereof and for generating an air amount signal, an exhaust manifold connected to the engine for exhausting burnt gases, a nitrogen oxide concentration sensor inserted in the exhaust manifold for detecting a nitrogen oxide amount in the burnt gases and for producing a nitrogen oxide signal, a crank angle sensor mounted on the engine for sensing an engine speed and for generating an engine speed signal, a pressure sensor mounted on the engine for detecting a combustion pressure in a cylinder and for outputting a pressure signal, an EGR valve communicated to the exhaust manifold for recirculating exhaust gases to the intake manifold and mode setting means for switching an engine operating mode from an economy mode to a power mode or vise versa, the system comprising: driving condition determining means, responsive to the engine speed and pressure signals, for deciding an operating condition of the engine and for generating an operating condition signal; combustion fluctuating rate calculating means, responsive to the pressure signal, for calculating an actual combustion fluctuating rate and for generating a fluctuating rate signal; combustion fluctuating rate comparing means, responsive to said operating condition and the fluctuating rate signals, for deriving an optimum air-fuel ratio by comparing the fluctuating rate signal with a standard value stored in a map and for producing a first control signal; nitrogen oxide gas calculating means, responsive to the nitrogen oxide signal, for calculating an actual nitrogen oxide gas amount and for generating a nitrogen oxide signal; exhaust gas comparing means, responsive to the operating condition signal and the nitrogen oxide exhaust signals, for judging the optimum air-fuel ratio by comparing the actual nitrogen oxide gas amount with a desired nitrogen oxide value stored in a memory and for producing a second control signal; and emission gas recirculation rate setting means, responsive to the first and second control signals, for deciding an optimum EGR rate by referring a target EGR rate corresponded to each engine operating condition stored in an EGR map so as to accurately operate the EGR valve in both said economy and power modes.

According to the second apparatus, the combustion fluctuating rate is obtained in accordance with the pressure in the cylinder, and the NOx exhaust rate is obtained in accordance with the concentration of the NOx in exhaust gas and the intake air amount.

Subsequently, the combustion fluctuating rate and the limit value under the present driving condition are compared, while the NOx exhaust rate and the limit value under the present driving condition are compared.

If the combustion fluctuating rate is higher than the limit value, the EGR amount is decreased. The NOx exhaust rate is higher than the limit value, on the other hand, the EGR amount is increased to reduce the NOx exhaust.

Thus, the EGR control under each of driving conditions is carried out on the basis of the combustion fluctuating rate and the NOx exhaust rate. Accordingly, the restraint of the combustion fluctuating rate and the reduction of the NOx exhaust rate can be obtained, so that high-reliability control accuracy can be attained.

Within the range of the EGR control region, moreover, the driver can select the EGR rate so that the rate is increased when the fuel cost is preferential and is decreased when the running performance is preferential. Thus, the driving performance is available at the driver's intention, ensuring good convenience of use.

DETAILED DESCRIPTION OF THE PREFERRED EMBODIMENTS

Preferred embodiments of the present invention will become understood from the following detailed description referring to the accompanying drawings.

A first embodiment of the present invention will now be described with reference to the drawings of FIGS. 1 to 3.

Figure 1:
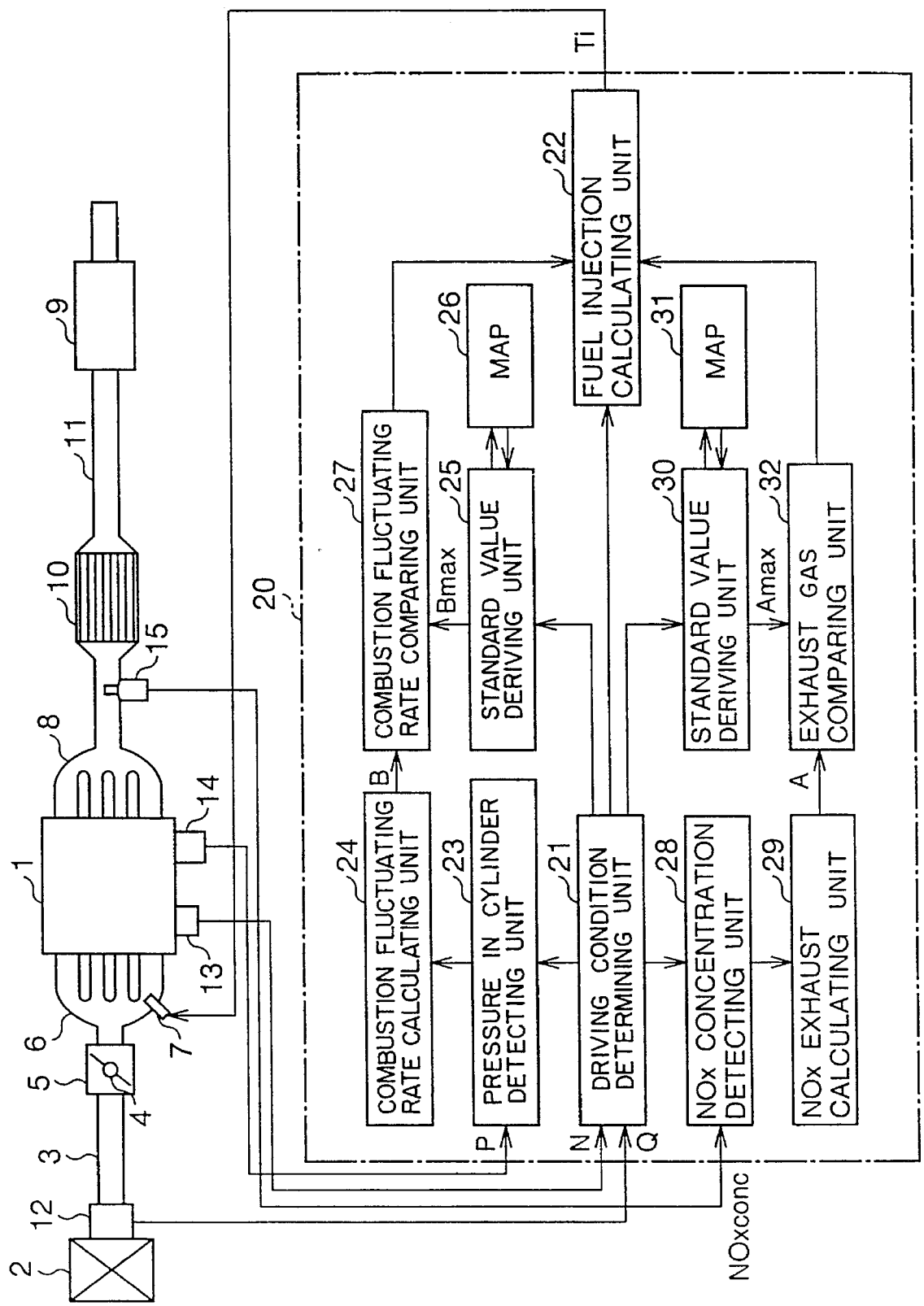
FIG. 1 is a block diagram of an air-fuel ratio control apparatus for a lean-burn engine according to a first embodiment of the present invention.

Referring to FIG. 1, the general structure of a lean-burn engine will be described. Numeral 1 denotes an engine body for lean combustion. In an air induction system of the engine body 1, an air cleaner 2 communicates with an intake manifold 6 by a duct 3 and a throttle body 5 which is provided with a throttle valve 4. The manifold 6 is fitted with an injector 7 for injecting a fuel for each cylinder. The intake manifold 6 is provided with means (not shown) for generating swirls or tumbles, whereby swirls or tumbles are produced in a combustion chamber during air intake, so that a leaner air-fuel mixture than that with the theoretical air-fuel ratio is used for combustion.

In the lean-burn engine, moreover, the fuel is so lean that HC and CO, harmful substances, in the exhaust gas are little, but NOx can not be decreased, so that it is necessary to decrease NOx. To attain this, an exhaust manifold 8 is fitted with a lean-NOx catalytic converter 10 as an exhaust emission control unit. Thus, the NOx in the exhaust gas is mainly reduced at a high temperature by a lean-NOx catalyst, so that the exhaust gas is purified. The catalytic converter 10 communicates with a muffler 9 through an exhaust pipe 11.

The following is a principle of a control system.

The pressure in the cylinder at an expansion stroke after combustion is detected to determine the fluctuating state of combustion, while the NOx concentration of an exhaust system is detected, and the actual NOx exhaust is calculated. FIG. 2 shows characteristic curves representing the NOx exhaust and combustion fluctuating rate compared with the air-fuel ratio (A/F).

Figure 2:
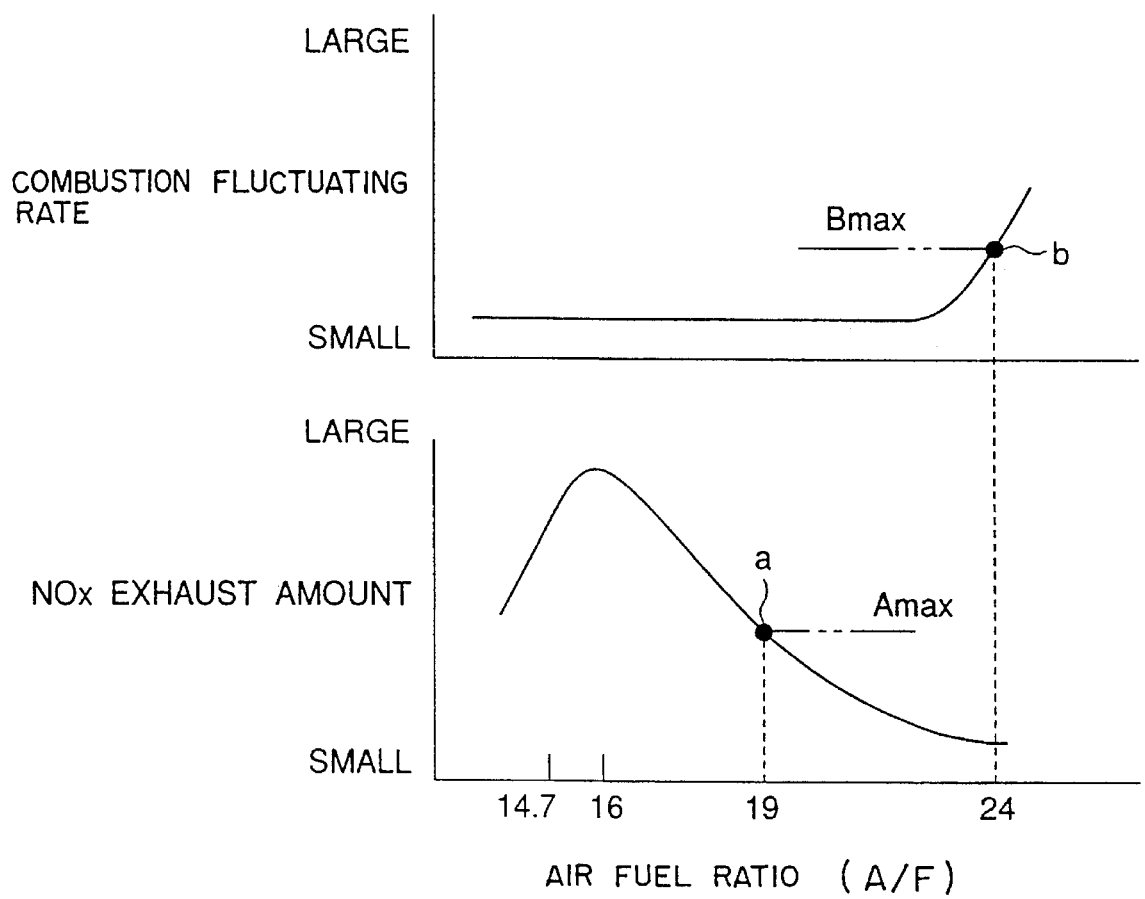
FIG. 2 is a diagram showing an NOx exhaust and combustion fluctuating rate compared with the air-fuel ratio according to the first embodiment.
Figure 3:
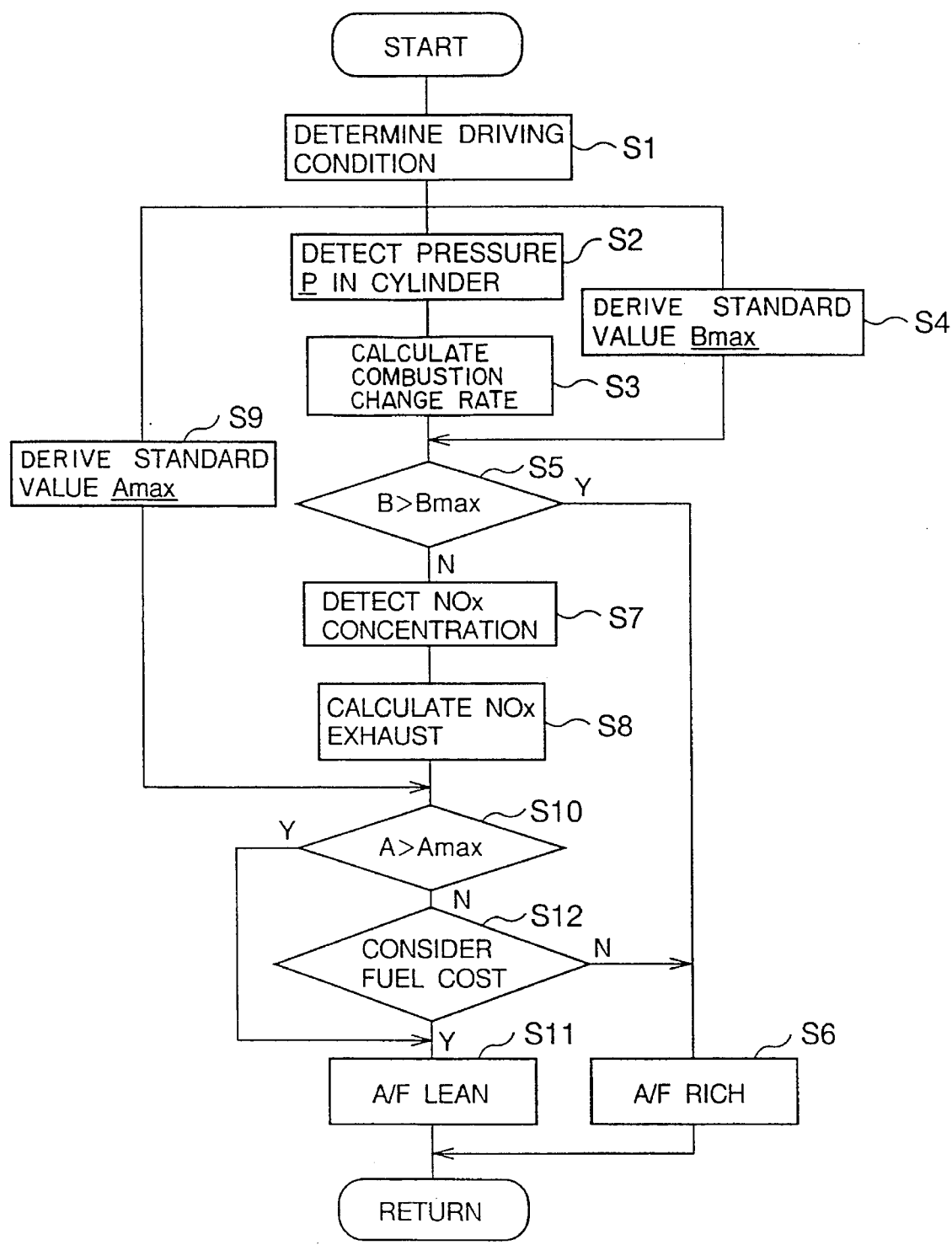
FIG. 3 is a flow chart showing an air-fuel ratio control according to the first embodiment.

When lean control is effected with the air-fuel ratio leaner than the theoretical air-fuel ratio at 14.7, as shown in FIG. 2, the NOx exhaust reaches the maximum value when the air-fuel ratio is about 16, and thereafter, decreases gradually as the air-fuel ratio is lean. Thus, a point a at which the air-fuel ratio is 19 is an allowable limit of the amount of NOx in the exhaust gas.

On the other hand, the combustion fluctuating rate continues to be low on the lean side of the air-fuel ratio, and starts suddenly to become higher when the air-fuel ratio attains about 23. Thus, a point b at which the air-fuel ratio is 24 is the lean-side limit for combustion fluctuating.

As seen from these circumstances, it is necessary only that the air-fuel ratio on the lean side be controlled so as to be adjusted to the region between the points a and b (i.e., 19 to 24).

The control system will now be described on the basis of the above-described control principle.

Signals from an airflow meter 12 for detecting an intake air amount Q and a crank angle sensor 13 for detecting an engine speed N are applied to the input of a control unit 20. Each cylinder of the engine body 1 is equiped with a cylinder pressure sensor 14 for detecting a cylinder pressure P. An exhaust manifold 8 is fitted with an NOx concentration sensor 15 for detecting the NOx concentration. Signals from these two sensors are also applied to the input of the control unit 20.

The control unit 20 includes a driving condition determining unit 21 which receives the engine speed N and the intake air amount Q. Engine driving conditions are determined in accordance with both these parameters. Signals for the driving conditions are applied to the input of an injection quantity calculating unit 22. An injection quantity Ti is calculated so that a low-NOx lean air-fuel mixture is obtained, depending on the driving conditions of the lean-burn engine. The resulting injection signal is delivered to the injector 7 with a predetermined timing.

The cylinder pressure P and the driving condition signals are applied to the input of a cylinder pressure detecting unit 23, whereby the cylinder pressure P for each driving condition is detected. The cylinder pressure P is applied to the input of a combustion fluctuating rate calculating unit 24, and an actual combustion fluctuating rate B is obtained in accordance with the change of the cylinder pressure P. The driving condition signals are applied to the input of a combustion fluctuating rate standard value retrieving unit 25, whereupon a standard value Bmax of the lean-side limit for each driving condition is retrieved with reference to a combustion fluctuating rate reference map 26. The actual combustion fluctuating rate B and the standard value Bmax of the lean-side limit are applied to the input of a combustion fluctuating rate comparing unit 27, whereupon they are compared with each other. If B>Bmax is given, the injection quantity calculating unit 22 is ordered to enrich the air-fuel mixture.

The NOx concentration and the driving condition signals are applied to the input of an NOx concentration detecting unit 28, whereupon the NOx concentration for each driving condition is detected. This NOx concentration is applied to the input of an NOx exhaust calculating unit 29, whereupon the intake air amount Q, NOx concentration NOxconc, and specific gravity γ of NOx are multiplied together to calculate an actual NOx exhaust A. Also, the driving condition signals are applied to the input of an NOx delivery standard value retrieving unit 30, whereupon an allowable-limit standard value Amax for each driving condition is retrieved with reference to an NOx delivery standard map 31. The actual exhausted NOx A and the allowable-limit standard value Amax are applied to the input of an exhaust gas comparing unit 32, whereupon they are compared with each other. If A>Amax is given, the injection quantity calculating unit 22 is ordered to make the air-fuel mixture lean.

In response to the order for the rich air-fuel mixture based on the combustion fluctuating rate B or for the lean mixture based on the NOx exhaust A, the injection quantity calculating unit 22 increases or decreases the injection quantity Ti to correct it. In the case where the fuel cost or running performance is preferential, the injection quantity Ti is generally decreased or increased depending on the mode. Thus, the air-fuel ratio is controlled so as to be always kept in the region between the points a and b of FIG. 2. The control unit 20 determines a proper ignition timing which depends on the state of operation, in accordance with various input informations, and delivers an ignition signal to an igniter.

The following is a description of the general operation of the lean-burn engine.

In operating the engine, air is first induced into the engine body 1 in accordance with the opening of the throttle valve 4. Then, swirls or the like are generated in the combustion chamber by the swirl generating means of the intake manifold 6. Depending on each set of driving conditions based on the intake air amount Q and the engine speed N, moreover, the injection quantity Ti is calculated so that the air-fuel mixture is a lean one which substantially entails a low NOx. This fuel is injected with a predetermined injection timing by means of the injector 7. A mixture of air and the fuel in the combustion chamber is ignited by means of an ignition plug when it is stratified so as to be thicker in the region near the ignition plug than in the surrounding region as the swirls are generated. Thus, the lean air-fuel mixture can be burned satisfactorily, ensuring reasonable fuel cost and satisfactory driving performance.

Meanwhile, the exhaust gas produced by lean combustion is discharged from the engine body 1 into the exhaust manifold 8. Although the amount of unburned HC and CO in the exhaust gas is small due to the lean-burn air-fuel ratio, in this case, NOx must be decreased. The exhaust gas containing the NOx is introduced into the lean-NOx catalytic converter 10, and the NOx is reduced at high temperature by the lean-NOx catalyst, so that the gas is purified. The exhaust gas thus purified by the converter 10 is further discharged in an atmosphere through the muffler 9 in the down-stream side.

Referring now to the flow chart of FIG. 3, air-fuel ratio control for the lean-burn engine operation according to the first embodiment will be described.

First, in Step S1, the driving conditions are determined by the engine speed N and the intake air amount Q. The cylinder pressure P is detected in Step S2, and the combustion fluctuating rate B is calculated in Step S3. In Step S4, the lean-limit standard value Bmax of the combustion fluctuating rate is retrieved with reference to the map.

In Step S5, the actual combustion fluctuating rate B and the lean-limit standard value Bmax are compared with each other. If the air-fuel ratio exceeds the lean-side limit so that the combustion fluctuation increases due to a misfire with B>Bmax, the program advances to Step S6, whereupon the fuel is increased to enrich the lean air-fuel mixture for correction. Thus, the combustion fluctuate is restrained in case of the misfire, so that deterioration of the driving performance can be prevented.

If B≦Bmax is given so that the air-fuel mixture is controlled on the rich side with a less combustion fluctuation, on the other hand, the program advances from Step S5 to Step S7, whereupon the actual NOx concentration NOx-conc is detected. The NOx exhaust A is calculated in Step S8, and the allowable-limit standard value Amax of the NOx exhaust corresponding to the driving conditions is retrieved in Step S9.

Then, the two values are compared with each other in Step S10. If the NOx exhaust A exceeds its allowable limit so that the exhaust gas worsens with A>Amax, the program advances to Step S11, whereupon the fuel is decreased to correct the air-fuel ratio to the lean side. Thus, the air-fuel mixture becomes leaner, so that the NOx exhaust is lessened.

If A≦Amax is given, it is decided that the exhaust gas is in a good condition, and that the air-fuel mixture is within the proper range between in the points a and b of FIG. 2. In this case, the program advances from Step S10 to Step S12, whereupon the preferable mode is selected. If the mode is a fuel-economy mode for the precedence of fuel cost, the program advances to Step S11, whereupon the air-fuel mixture is controlled so as to be leaner, so that the fuel cost is improved to the maximum. If the mode is a power mode for the precedence of running performance, the program advances to Step S6, whereupon the air-fuel mixture is controlled so as to be richer. As a result, the air-fuel mixture becomes relatively rich, so that vibration and other characteristics are improved.

Thus, the lean-burn air-fuel ratio of the lean-burn engine is always controlled within the region between the lean-side limit b for combustion fluctuation and the allowable limit a of the NOx exhaust. Accordingly, both the driving performance and the exhaust gas characteristics can be maintained favorably at the same time. Since the NOx concentration of the exhaust gas is restricted to the allowable limit, the lean-NOx catalytic converter 10 of the exhaust system can always remove the NOx with reliability.

In the lean-burn engine according to the first embodiment, as described above, the actual NOx concentration of the exhaust gas is detected to determine the state of NOx exhaust, and the air-fuel mixture is controlled within the region between the lean-side limit for combustion fluctuation and the allowable limit of the NOx exhaust. Accordingly, the driving performance is improved, and the NOx in the exhaust gas is decreased securely. Since the region for the air-fuel ratio control is extended on the rich side, moreover, vibration can be lessened in the power mode.

For each driving condition, furthermore, the combustion fluctuation is compared with its standard value to determine the operation state, the NOx exhaust is compared with its standard value to determine the state of the exhaust gas, and the air-fuel ratio is controlled on the rich or lean side. Thus, the control accuracy is high.

Referring now to FIGS. 4 to 8, an engine control apparatus according to a second embodiment of the present invention will be described.

Figure 4:
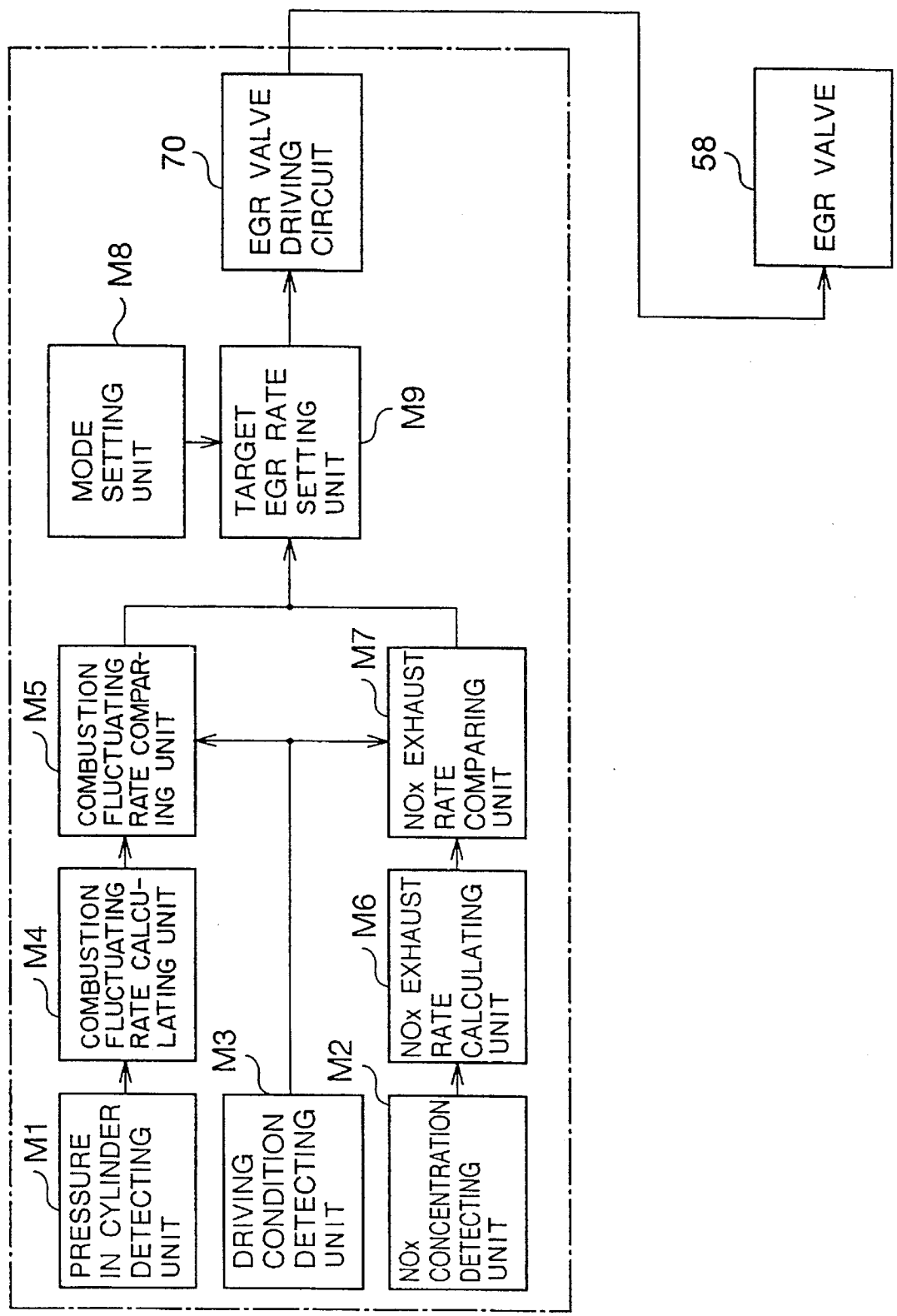
FIG. 4 a functional block diagram of an EGR control apparatus according to a second embodiment of the present invention.
Figure 5:
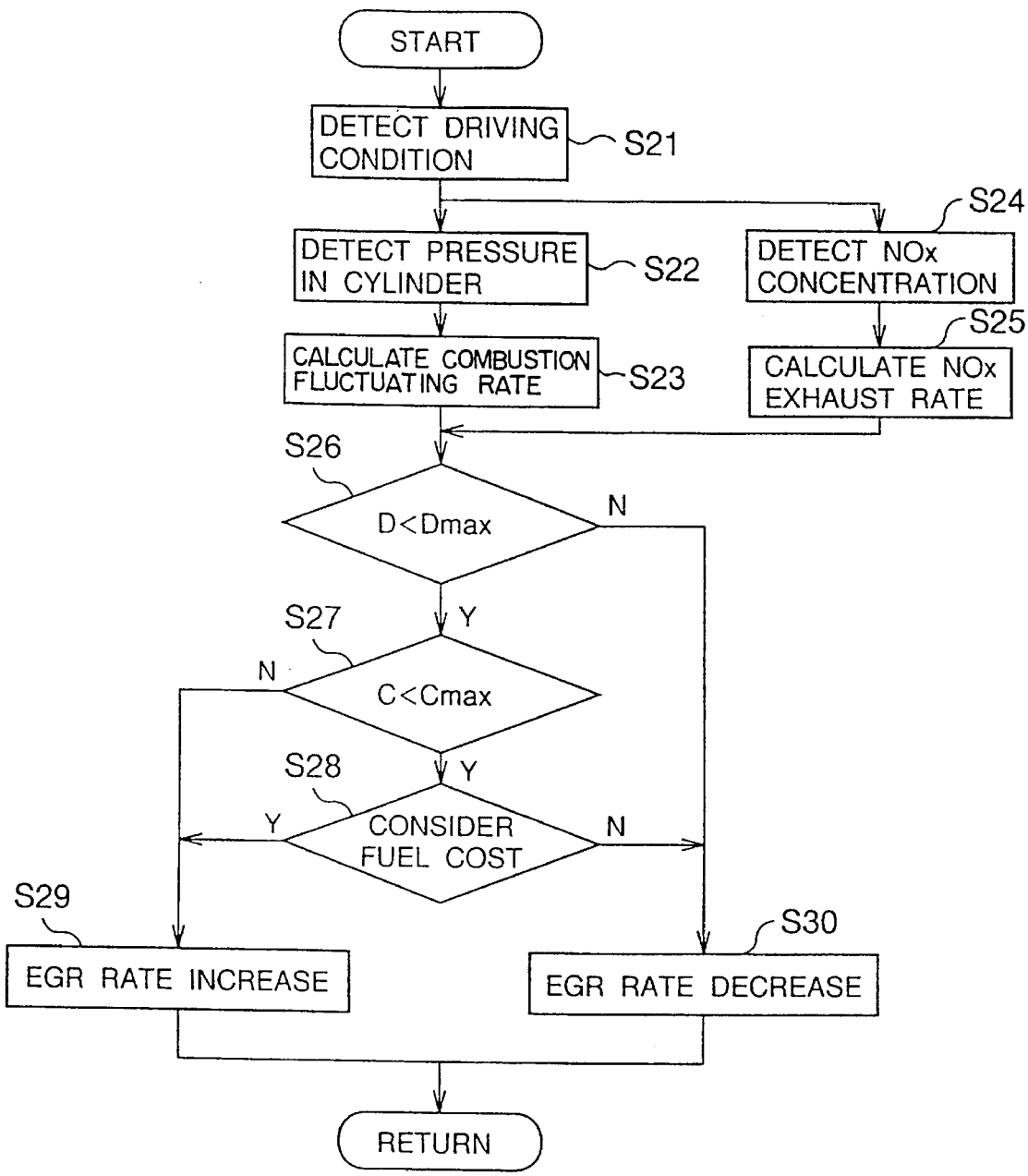
FIG. 5 is a flow chart showing an EGR control sequence according to the second embodiment.
Figure 6:
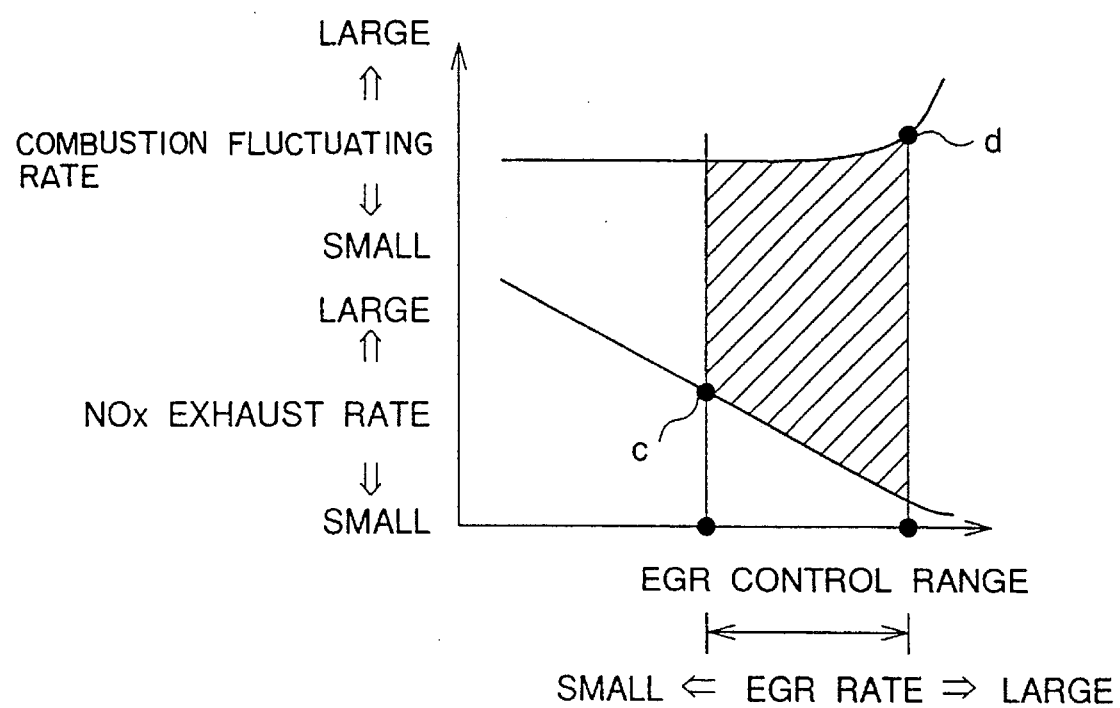
FIG. 6 is a conceptual diagram showing an EGR control range according to the second embodiment.
Figure 7:
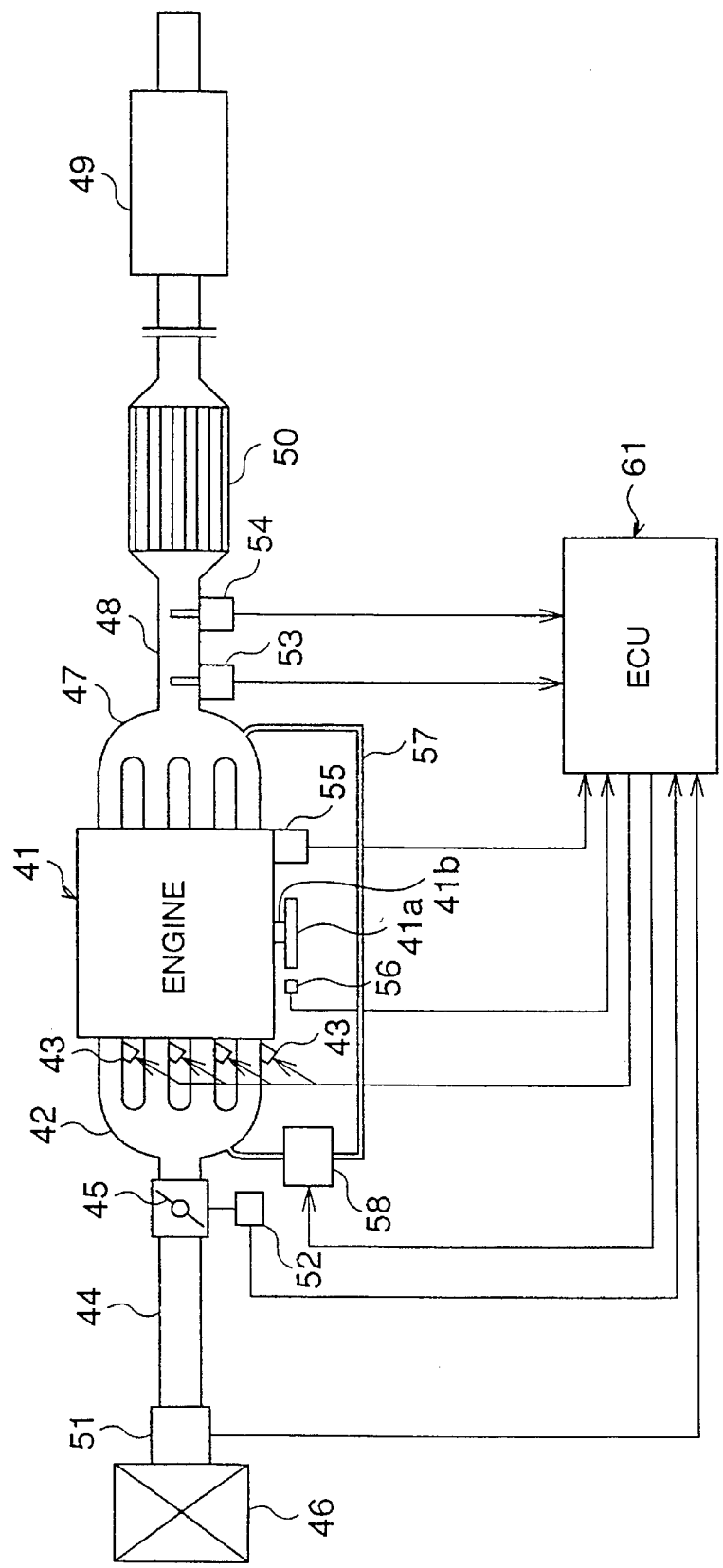
FIG. 7 is a schematic view of the engine according to the second embodiment.
Figure 8:
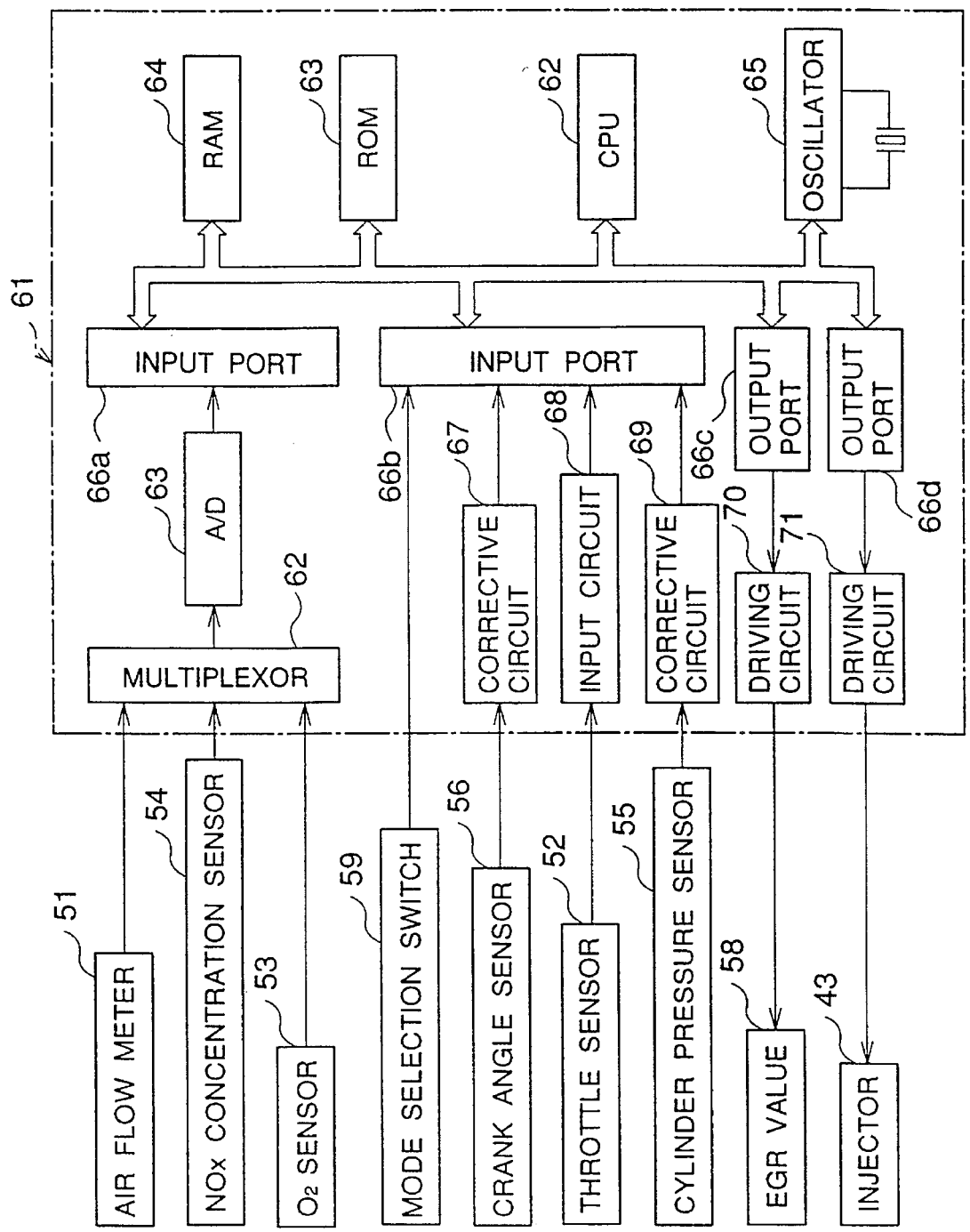
FIG. 8 is a circuit diagram of the control apparatus according to the second embodiment.

FIG. 4 is a functional block diagram of the EGR control apparatus, FIG. 5 is a flow chart showing an EGR control sequence, FIG. 6 is a conceptual diagram showing an EGR control range, FIG. 7 is a schematic view of an engine, and FIG. 8 is a circuit diagram of the control apparatus.

In FIG. 7, numeral 41 denotes an engine body. An intake manifold 42 communicates with the upstream side of the engine body 1. An injector 43 is located directly on the upstream side of an intake valve (not shown) which is attached to an intake port of each cylinder of the intake manifold 42. A throttle valve 45 is provided in an intake pipe 44 which communicates with the intake manifold 42. An air cleaner 46 is attached to an intake port of the pipe 44.

An exhaust pipe 48 communicates with the downstream side of the engine body 41 by an exhaust manifold 47. A muffler 49 communicates with the downstream side of the exhaust pipe 48, and a catalyst 50 for purifying the exhaust gas is provided in the middle of the pipe 48. The engine according to the illustrated embodiment serves for the control of the theoretical air-fuel ratio, and a ternary catalyst is used as the catalyst 50.

An airflow meter 51 for detecting the mass flow of the intake air is attached to the intake port of the intake pipe 44 of the suction system. A throttle sensor 52 for detecting the opening of the throttle valve 45 is located adjacent to the valve 45.

An $O_2$ sensor 53 for detecting the oxygen concentration of the exhaust gas and an NOx concentration sensor 54 for detecting the concentration of nitrogen oxides (NOx), such as NO and $NO_2$, in the exhaust gas are interposed between the junction of the exhaust manifold 47 of the exhaust system and the catalyst 50.

A cylinder pressure sensor 55 is provided for detecting the internal pressure of a specific cylinder, and a crank angle sensor 56 is opposed to a crank rotor 41b which is mounted on a crank shaft 41a. The sensor 56 is designed so as to detect protrusions or the like which are arranged at regular intervals on the outer peripheral surface of the rotor 41b. The sensor 56 calculates the engine speed N and ignition timing according to the time intervals at which the protrusions are detected.

The respective junctions of the exhaust and intake manifolds 47 and 42 communicate with each other by an EGR passage 57. An EGR valve 58 is provided in the middle of the passage 57. When the valve 58 is opened, small amount of the exhaust gas, depending on the opening degree of the valve 58, is returned to the induction system and burned again.

As shown in FIG. 8, an ECU 61 is provided with a CPU 62, a ROM 63, a RAM 64, an oscillator 65, input ports 66a and 66b, and output ports 66c and 66d. These elements are connected to a microcomputer via a bus line.

Analog signals from the airflow meter 51, the NOx concentration sensor 54, and the $O_2$ sensor 53 are delivered to an A/D converter 63 through a multiplexer 62. Thereupon, they are converted into digital signals in the converter 63, and are applied in succession to the one input port 66a. The waveform of a crank angle signal from the crank angle sensor 56 is properly shaped in a shaping circuit 67, and is applied to the other input port 66b. A signal from the throttle sensor 52 is applied to the other input port 66b through an input circuit 68, whereupon it is determined whether the throttle valve 45 is open or fully closed. The peak value of an output from the cylinder pressure sensor 55 is waveform-shaped by a shaping circuit 69, and is applied to the other input port 66b.

Further, the input port 66b is connected with a mode selector switch 59. By operating the switch 59, a driver can select the precedence mode between the cost-first mode and the power mode. If the fuel-economy mode is selected by the selector switch 59, EGR control is carried out with the maximum value of an EGR rate within the EGR Control range. If the power mode is selected, on the other hand, the EGR control is effected with the minimum value of the EGR rate within the EGR control range.

Moreover, the EGR valve 58 and the injector 43 are connected to the output ports 66c and 66d through driving circuits 70 and 71, respectively. The opening of the valve 58 is controlled in response to a control signal for a predetermined duty ratio outputted from the ECU 61.

The following is a description of an arrangement for the EGR control in the ECU 61.

As shown in FIG. 4, the ECU 61 is provided with a cylinder pressure detecting unit M1 which, based on the output value of the cylinder pressure sensor 55, detects the peak value of a cylinder pressure for each cycle or a cylinder pressure for a fixed crank angle during a combustion stroke. Also, the ECU 61 is provided with an NOx concentration detecting unit M2 for detecting the NOx concentration of the exhaust gas in accordance with the output value of the NOx concentration sensor 54. Moreover, the ECU 61 includes a driving condition detecting unit M3 for detecting engine driving conditions on the basis of an engine speed $N_E$, intake air amount Q, etc.

The ECU 61 is further provided with a combustion fluctuating rate calculating unit M4 which calculates a combustion fluctuating rate (D) in accordance with the ratio between the weighted average of the peak value of the cylinder pressure for each cycle detected by the cylinder pressure detecting unit M1 and the cylinder pressure detected this time or the ratio between the weighted average of the cylinder pressure for the fixed crank angle for each combustion cycle and the cylinder pressure detected this time.

Moreover, the ECU 61 is provided with a comparing unit M5 which compares the combustion fluctuating rate (D), calculated by the combustion fluctuating rate calculating unit M4 with an allowable limit value (Dmax) of the combustion fluctuating rate (D), which is set by map retrieval, using as parameters the engine speed N and engine load (e.g., basic injection quantity obtained in accordance with the engine speed N and intake air amount Q) detected by the driving condition detecting unit M3.

Furthermore, the ECU 61 is provided with an NOx exhaust rate calculating unit M6 for calculating an NOx exhaust rate (C) according to the NOx concentration of the exhaust gas and the intake air amount Q.

The ECU 61 is further provided with an NOx exhaust rate comparing unit M7 which compares the NOx exhaust rate (C), calculated by the NOx exhaust rate calculating unit M6, with an allowable limit value (Cmax) of the NOx exhaust rate (C), which is set by map retrieval, using as parameters the engine speed N and engine load (e.g., basic injection quantity obtained in accordance with the engine speed N and the intake air amount Q) detected by the driving condition detecting unit M3.

Moreover, the ECU 61 includes a driving mode setting unit M8 for setting the driving mode by determining, from the output value of the mode selector switch 59, whether the selected mode is the economy mode or the power mode.

The ECU 61 further includes a target EGR rate setting unit M9 which sets a target EGR rate when the combustion fluctuating rate comparing unit M5 concludes that the combustion fluctuating rate (D) is lower than the allowable limit value (Dmax), and when the NOx exhaust rate comparing unit M7 concludes that the NOx exhaust rate is lower than the allowable limit value (Cmax). Also, the unit M9 sets the target EGR rate with the value of the EGR rate decreased when the combustion fluctuating rate (D) is higher than the allowable limit value (Dmax), and sets the target EGR rate with the value of the EGR rate increased when the NOx exhaust rate (C) is higher than the allowable limit value (Cmax).

Furthermore, the EGR 61 is provided with the EGR valve driving circuit 70 which delivers a driving signal corresponding to the target EGR rate to the EGR valve 58.

Referring now to the flow chart of FIG. 5, the sequence of EGR control by the ECU 61 will be described.

The flow chart (FIG. 5) shows a routine which is executed for each predetermined crank angle or each predetermined calculation period.

First, various data for the engine driving conditions, including the present engine speed N, the intake air amount Q, etc. are detected in Step S21. The cylinder pressure for the present combustion cycle is detected in Step S22, and the combustion fluctuating rate (D) is calculated on the basis of the ratio between the weighted average of cylinder pressures for the individual combustion cycles and the cylinder pressure for the present combustion cycle in Step S23. In Step S24, on the other hand, the NOx concentration of the exhaust gas is detected in accordance with the output signal from the NOx concentration sensor 54. In Step S25, the exhaust rate (C) of the NOx in the exhaust gas is calculated on the basis of the ratio between the intake air amount Q and the NOx concentration.

In Step S26, the combustion fluctuating rate (D) is compared with the allowable limit value (Dmax) which is previously set by map retrieval using the engine speed N and the engine load as parameters.

FIG. 6 shows the relationship between the EGR rate and the combustion fluctuating rate (D) under certain driving conditions. As shown in FIG. 6, the combustion fluctuating rate (D) tends suddenly to rise when the EGR rate is increased to a certain level. The allowable limit value (Dmax) of the combustion fluctuating rate (D), which is indicated by a point d in FIG. 6, varies depending on the driving conditions. The map is loaded with the allowable limit values (Dmax) for varied driving conditions which are previously obtained through various experiments or the like.

If it is concluded in Step S26 that the combustion fluctuating rate (D) under the current driving conditions is lower than the allowable limit value (Dmax), the program advances to Step S27. If it is concluded that the changing rate (D) is higher than the allowable limit value (Dmax), on the other hand, the program jumps to Step S30, whereupon the target EGR rate is set at a predetermined reduced value, and the routine is finished.

If it is concluded in Step S26 that the combustion fluctuating rate (D) is lower than the allowable limit value (Dmax), moreover, the NOx exhaust rate (C) is compared, in Step S27, with the allowable limit value (Cmax) which is previously set by map retrieval using the engine speed N and the engine load as parameters.

FIG. 6 shows the relationship between the EGR rate and the NOx exhaust rate (C) under certain driving conditions. As shown in FIG. 6, the NOx exhaust rate (C) tends to vary substantially in inverse proportion to the EGR rate and gradually to increase as the EGR rate is decreased. The allowable limit value (Cmax), which is indicated by a point c in FIG. 6, varies depending on the driving conditions. The map is stored with the allowable limit values (Cmax) for varied driving conditions which are previously obtained through various experiments or the like.

If it is concluded in Step S27 that the NOx exhaust rate (C) is higher than the allowable limit value (Cmax), the program jumps to Step S29, whereupon the target EGR rate is set at a predetermined increased value, and the routine is finished.

If it is concluded in Step S27 that the NOx exhaust rate (C) is lower than the allowable limit value (Cmax), on the other hand, the program advances to Step S28, whereupon it is determined, from the output signal from the mode selector switch 59, whether the mode selected by the driver is the economy mode or the power mode.

If the economy mode is selected, the program advances to Step S29, whereupon the target EGR rate is set at a predetermined increased value, and the routine is finished. If the power mode is selected, on the other hand, the program advances to Step S30, whereupon the target EGR rate is set at a predetermined decreased value, and the routine is finished.

The control signal for the predetermined duty ratio corresponding to the target EGR rate is delivered to the EGR valve 58 through the driving circuit 70.

If the target EGR rate is adjusted to a value such that the EGR rate increases, the opening degree of the EGR valve 58 is reduced. As a result, the EGR rate for the reflux to the induction system with this opening degree of the valve 58 is controlled so as to be within the range from the allowable limit value (Cmax) to the allowable limit value (Dmax).

If the driver selects the power mode, the EGR rate is controlled so as to be reduced within the EGR control range mentioned above. If the economy mode is selected, on the other hand, the EGR rate is controlled so as to be increased within the EGR control range. The driving performance is available at the driver's request.

The present invention may be also applied to lean-burn air-fuel ratio control. In this case, a lean-NOx catalyst is used as the catalyst 50, and the $O_2$ sensor can be omitted.

According to the second embodiment of the present invention, as described above, the EGR control under each of driving conditions is carried out on the basis of the combustion fluctuating rate and the NOx exhaust rate. Accordingly, the restraint of the combustion fluctuating rate and the reduction of the NOx exhaust rate can be attained, so that high-reliability control accuracy can be obtained.

Within the range of the EGR control region, moreover, the driver can control the EGR rate so that the EGR rate is increased when the fuel cost is preferential and is decreased when the running performance is preferential. Thus, the driving performance is available at the driver's request, ensuring good convenience of use.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An electronic control system for an engine having, an intake manifold connected to said engine for inducting an air and fuel mixture, an airflow meter mounted on said intake manifold via a throttle valve for measuring an amount of air inducted thereof and for generating an air amount signal, an exhaust manifold connected to said engine for exhausting burnt gases, a nitrogen oxide concentration sensor inserted in said exhaust manifold for detecting a nitrogen oxide amount in said burnt gases and for producing a nitrogen oxide signal, a crank angle sensor mounted on said engine for sensing an engine speed and for generating an engine speed signal, a pressure sensor mounted on said engine for detecting a combustion pressure in a cylinder and for outputting a pressure signal and a fuel injector, the system comprising:

driving condition determining means, responsive to said engine speed and pressure signals, for determining an operating condition of said engine and for generating an operating condition signal;

combustion fluctuating rate calculating means, responsive to said pressure and operating condition signals, for calculating an actual combustion fluctuating rate and for generating a fluctuating rate signal;

combustion fluctuating rate comparing means, responsive to said operating condition and said fluctuating rate signals, for deriving an optimum air-fuel ratio by comparing said fluctuating rate signal with a standard value stored in a map and for producing a first control signal;

nitrogen oxide exhaust calculating means, responsive to said nitrogen oxide signal and said operating condition signal, for calculating an actual nitrogen oxide gas amount in said burnt gases and for generating a nitrogen oxide signal;

exhaust gas comparing means, responsive to said operating condition signal and said nitrogen oxide signal, for judging said optimum air-fuel ratio by comparing said actual nitrogen oxide gas amount with a desired value stored in a memory and for producing a second control signal; and fuel injection calculating means, responsive to said first and second control signals, for deciding an optimum fuel injection amount corresponding to each driving condition to thereby enable the correct amount of fuel to be injected by said fuel injector so as to accurately control said engine without fluctuation.

2. The electronic control system according to claim 1, wherein
said first control signal makes said air-fuel ratio rich when said combustion fluctuating rate becomes larger than said standard value.

3. The electronic control system according to claim 1, wherein
said second control signal makes said air-fuel ratio lean when said actual nitrogen oxide gas amount becomes larger than said desired value.

4. An electronic control method for an engine having, an intake manifold connected to said engine for inducting an air and fuel mixture, an airflow meter mounted on said intake manifold via a throttle valve for measuring an amount of air inducted thereof and for generating an air amount signal, an exhaust manifold connected to said engine for exhausting burnt gases, a nitrogen oxide concentration sensor inserted in said exhaust manifold for detecting a nitrogen oxide amount in said burnt gases and for producing a nitrogen oxide signal, a crank angle sensor mounted on said engine for sensing an engine speed and for generating an engine speed signal, a pressure sensor mounted on said engine for detecting a combustion pressure in a cylinder and for outputting a pressure signal and a fuel injector, the method comprising:

determining an operating condition of said engine from said engine speed signal and pressure signal and generating an operating condition signal;

calculating an actual combustion fluctuating rate from said pressure signal and said operating condition signal and generating a fluctuating rate signal;

deriving an optimum air-fuel ratio by comparing said fluctuating rate signal with a standard value stored in a map and producing a first control signal;

computing an actual nitrogen oxide gas amount from the amount of nitrogen oxide in the exhaust gas and generating a nitrogen oxide signal;

judging said optimum air-fuel ratio by comparing said actual nitrogen oxide gas amount with a desired value stored in a memory and generating a second control signal; and setting an optimum fuel injection amount for said fuel injector corresponding to each driving condition from said first and second control signals so as to accurately control said engine without fluctuation.

* * * * *